(12) United States Patent
Lawrence et al.

(10) Patent No.: US 8,156,444 B1
(45) Date of Patent: Apr. 10, 2012

(54) SYSTEMS AND METHODS FOR DETERMINING A USER INTERFACE ATTRIBUTE

(75) Inventors: Stephen R. Lawrence, Mountain View, CA (US); Nikhil Bhatla, Sunnyvale, CA (US); Lawrence Page, Mountain View, CA (US); David Marmaros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 2375 days.

(21) Appl. No.: 10/750,105

(22) Filed: Dec. 31, 2003

(51) Int. Cl.
*G06F 3/048* (2006.01)
*G06F 17/00* (2006.01)

(52) U.S. Cl. .................... 715/788; 715/273

(58) Field of Classification Search .......... 715/526, 715/788, 273
See application file for complete search history.

(56) References Cited

U.S. PATENT DOCUMENTS

| | | | |
|---|---|---|---|
| 4,825,388 A * | 4/1989 | Dailey et al. ............. | 345/595 |
| 5,388,257 A | 2/1995 | Bauer | |
| 5,701,469 A | 12/1997 | Brandli et al. | |
| 5,701,474 A | 12/1997 | Harper | |
| 5,758,331 A | 5/1998 | Johnson | |
| 5,813,007 A | 9/1998 | Nielsen | |
| 5,859,639 A * | 1/1999 | Ebrahim ................. | 715/788 |
| 5,867,729 A | 2/1999 | Swonk | |
| 5,886,694 A * | 3/1999 | Breinberg et al. .......... | 715/788 |
| 6,006,222 A | 12/1999 | Culliss | |
| 6,009,459 A | 12/1999 | Belfiore et al. | |
| 6,014,665 A * | 1/2000 | Culliss ..................... | 707/5 |
| 6,078,916 A | 6/2000 | Culliss | |
| 6,169,979 B1 | 1/2001 | Johnson | |
| 6,182,068 B1 | 1/2001 | Culliss | |
| 6,272,489 B1 | 8/2001 | Rauch et al. | |
| 6,310,984 B2 * | 10/2001 | Sansom-Wai et al. ....... | 382/289 |
| 6,380,983 B1 | 4/2002 | Miyazaki et al. | |
| 6,384,840 B1 * | 5/2002 | Frank et al. ............ | 345/634 |
| 6,393,456 B1 | 5/2002 | Ambler et al. | |
| 6,401,097 B1 | 6/2002 | McCotter et al. | |
| 6,456,307 B1 | 9/2002 | Bates et al. | |
| 6,466,238 B1 | 10/2002 | Berry et al. | |
| 6,484,156 B1 | 11/2002 | Gupta et al. | |
| 6,484,162 B1 | 11/2002 | Edlund et al. | |

(Continued)

FOREIGN PATENT DOCUMENTS

WO    WO 01/55909    8/2001

OTHER PUBLICATIONS

IBM Technical Dislosure Bulletin, vol. 37, No. 01, Jan. 1994, "Desktop Rearrangement Based on Incoming Calls".*

(Continued)

*Primary Examiner* — William Bashore
*Assistant Examiner* — Henry Orr
(74) *Attorney, Agent, or Firm* — Fenwick & West LLP

(57) ABSTRACT

Systems and methods for determining a user interface attribute are described. In one method described, a display processor receives a request to display a content display in a user interface, detects an area of the user interface comprising non-primary content, and creates a content display having an attribute, the attribute associated with the area of the user interface comprising non-primary content. Such a method may also include modifying the attribute in response to changes in the area of the user interface comprising non-primary content.

43 Claims, 9 Drawing Sheets

U.S. PATENT DOCUMENTS

| | | | |
|---|---|---|---|
| 6,581,056 B1 | 6/2003 | Rao | |
| 6,654,036 B1* | 11/2003 | Jones | 715/798 |
| 6,701,009 B1* | 3/2004 | Makoto et al. | 382/164 |
| 6,711,565 B1 | 3/2004 | Subramaniam et al. | |
| 6,718,334 B1 | 4/2004 | Han | |
| 6,725,244 B1 | 4/2004 | Bonwick | |
| 6,735,774 B1 | 5/2004 | Krishnaswamy | |
| 6,745,178 B1 | 6/2004 | Emens et al. | |
| 6,801,906 B1 | 10/2004 | Bates et al. | |
| 6,816,847 B1 | 11/2004 | Toyama | |
| 6,971,068 B2* | 11/2005 | Bates et al. | 715/788 |
| 6,981,040 B1 | 12/2005 | Konig et al. | |
| 6,995,805 B1* | 2/2006 | Park | 348/700 |
| 7,031,961 B2 | 4/2006 | Pitkow et al. | |
| 7,047,502 B2 | 5/2006 | Petropoulos et al. | |
| 7,082,428 B1 | 7/2006 | Denny et al. | |
| 7,146,573 B2* | 12/2006 | Brown et al. | 715/802 |
| 7,149,974 B2* | 12/2006 | Girgensohn et al. | 715/723 |
| 7,162,473 B2 | 1/2007 | Dumais et al. | |
| 7,194,460 B2 | 3/2007 | Komamura | |
| 7,225,187 B2 | 5/2007 | Dumais et al. | |
| 7,409,646 B2 | 8/2008 | VedBrat et al. | |
| 2002/0019763 A1 | 2/2002 | Linden et al. | |
| 2002/0038299 A1 | 3/2002 | Zernik et al. | |
| 2002/0055919 A1 | 5/2002 | Mikheev | |
| 2002/0065841 A1 | 5/2002 | Matsuda et al. | |
| 2002/0107847 A1 | 8/2002 | Johnson | |
| 2002/0147704 A1 | 10/2002 | Borchers | |
| 2003/0112278 A1* | 6/2003 | Driskell | 345/788 |
| 2003/0135430 A1 | 7/2003 | Ibbotson | |
| 2003/0135490 A1 | 7/2003 | Barrett et al. | |
| 2003/0144996 A1 | 7/2003 | Moore | |
| 2003/0167266 A1 | 9/2003 | Saldanha et al. | |
| 2003/0217108 A1 | 11/2003 | Karim | |
| 2004/0003351 A1 | 1/2004 | Sommerer et al. | |
| 2004/0030741 A1 | 2/2004 | Wolton et al. | |
| 2004/0098394 A1 | 5/2004 | Merritt et al. | |
| 2004/0143564 A1 | 7/2004 | Gross et al. | |
| 2004/0143569 A1 | 7/2004 | Gross et al. | |
| 2004/0215607 A1 | 10/2004 | Travis | |
| 2004/0267730 A1 | 12/2004 | Dumais et al. | |
| 2005/0028108 A1* | 2/2005 | Baudisch et al. | 715/801 |
| 2005/0050454 A1 | 3/2005 | Jennery et al. | |
| 2005/0065958 A1 | 3/2005 | Dettinger et al. | |
| 2005/0076019 A1 | 4/2005 | Jackson et al. | |
| 2005/0086254 A1 | 4/2005 | Zou et al. | |
| 2005/0108394 A1 | 5/2005 | Braun et al. | |
| 2005/0108655 A1* | 5/2005 | Andrea et al. | 715/798 |
| 2005/0131888 A1 | 6/2005 | Tafoya et al. | |
| 2005/0149496 A1 | 7/2005 | Mukherjee et al. | |
| 2005/0149498 A1 | 7/2005 | Lawrence et al. | |
| 2006/0036966 A1 | 2/2006 | Yevdayev | |

OTHER PUBLICATIONS

U.S. Appl. No. 10/749,440, filed Dec. 31, 2003, Badros et al.
80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/wbipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1*st* Ed., Oct. 1999, O'Reilly™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," http://www7.scu.edu.au/programme/fullpapers/1921/com1921.htm, pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://devon-techonologies.com/products/devonthink.php, printed Mar. 16, 2004.
dtSearch®—http://www.dtsearch.com/, printed Mar. 15, 2004.
Dumais, S., et al, "Stuff I've Seen: A System for Personal Information Retrieval and Re-Use," Microsoft Research, SIGIR'03, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims, T., et al., "WebWatcher: A Tour Guide for the World Wide Web," 1996.
Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.
Naraine, R., "Future of Search Will Make You Dizzy," Enterprise. May 20, 2004, http://www.internetnews.com/ent-news/article.php/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated information retrieval system," *The Proceedings of the First International Conference on the Practical Application of Intelligent Agents and Multi Agent Technology* (PAAM '98), pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.
"Searching for the next Google—New trends are helping nimble startups elbow in to the plundered market," Red Herring—The Business of Technology, Mar. 9, 2004, http://redherring.com/PrintArticle.aspx?a=4782&sector=Capital, pp. 1-5, printed Mar. 30, 2004.
"Selecting Task-Relevant Sources for Just-In-Time Retrieval," pp. 1-3, no date.
Sherman, C., "HotBot's New Desktop Search Toolbar," www.searchenginewatch.com, http://searchenginewatch.com/searchday/print.php/34711_339921, pp. 1-3, printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page, "Welcome to the WebWatcher Project," http://www-2.cs.cmu.edu/~webwatcher/, printed Oct. 15, 2003.
"WhenU Just-In-Time Marketing," http://www.whenu.com, printed Mar. 19, 2004.
X1 instantly searches files & email. For outlook, Outlook, http://www.x1.com/, printed Mar. 15, 2004.
Zellweger, P., et al., "Fluid Links for Informed and Incremental Link Transitions," Proceedings of Hypertext'98, Pittsburgh, PA, Jun. 20-24, 1998. pp. 50-57.

Dumais, S., et al., "Implicit Queries (IQ) for Contextualization," Microsoft Research SIGIR'04, Jul. 25-29, 2004, ACM, 1 Page.

Dumais, S., et al., "Stuff I've Seen: A System for Personal Information Retrieval and Re-Use," Microsoft Research, SIGIR'03, Jul. 28-Aug. 1, 2003, ACM, 9 Pages.

Miller, B., "Associate File Extension with Shell Open command and Application," Code Project, Google Search, Jun. 2, 2000, 2 pages, can be retrieved at <URL:http://www.codeproject.com/shell/cgfiletype.asp>.

Salahour, A., et al., "Desktop Rearrangement Based on Incoming Calls", IBM Technical Disclosure Bulletin, Jan. 1994, pp. 657-658, vol. 37, No. 01.

Wynblatt, M., et al., "Web Page Caricatures: Multimedia Summaries for WWW Documents," Proc. IEEE Int'l Conf. Multimedia Computing and Systems, Jun. 22-Jul. 1, 1998, pp. 194-199.

Archive of "Froogle," www.froogle.google.com, 1 page, [online] [Archived by http://archive.com on Mar. 30, 2004; Retrieved on Oct. 20, 2006] Retrieved from the Internet<URL:http://web.archive.org/web/20040330045133/froogle.google.com>.

Archive of "Google News," www.news.google.com, 5 pages, [online] [Archived by http://archive.com on Mar. 25, 2004; Retrieved on Oct. 20, 2006] Retrieved from the Internet<URL:http://web.archive.org/web/20040325173400/http://www.news.google.com>.

* cited by examiner

FIG. 3

SYSTEMS AND METHODS FOR DETERMINING A USER INTERFACE ATTRIBUTE

RELATED APPLICATION

This application relates to application Ser. No. 10/750,127, filed herewith, titled "Systems and Methods for Generating a User Interface," the entirety of which is incorporated herein by reference. This application also relates to application Ser. No. 10/750,109, filed herewith, titled "Systems and Methods for Constructing a Query Result Set," the entirety of which is incorporated herein by reference.

FIELD OF THE INVENTION

The present invention relates generally to methods and systems for user interface generation. The present invention relates particularly to methods and systems for determining a user interface attribute.

BACKGROUND

Conventional search engines receive a search query from a user and execute a search against a global index. Such conventional search engines typically use one or more conventional methods for performing a search. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search results are often presented in a list format, comprising article identifiers and brief snippets about the documents in a web page that can be resized.

In a conventional user interface, the window comprising the search results may be layered on top of other windows or may be covered by other windows, or may reduce the space available for other windows. In either case, information that may be of interest to the user is obscured. In order to avoid the visual interference in the user interface, the user can manually adjust attributes of the display, such as the position and size of a window, to alleviate interference between windows.

A conventional interface may also provide a capability to adjust the relation of all windows displayed in the interface. For example, in the Microsoft® Windows environment, windows in the interface may be layered, cascaded, or arranged so that the windows together fill the display area.

A need exists to provide an improved system and method for automatically determining an attribute of a user interface.

SUMMARY

Embodiments of the present invention provide systems and methods for determining a user interface attribute. In one embodiment of the present invention, a display processor detects an area of the user interface comprising non-primary content, and creates a content display having an attribute, the attribute associated with the area of the user interface comprising non-primary content.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIG. 3 is a screen shot illustrating information displayed in a web page in one embodiment of the present invention;

DETAILED DESCRIPTION

Figure 1:
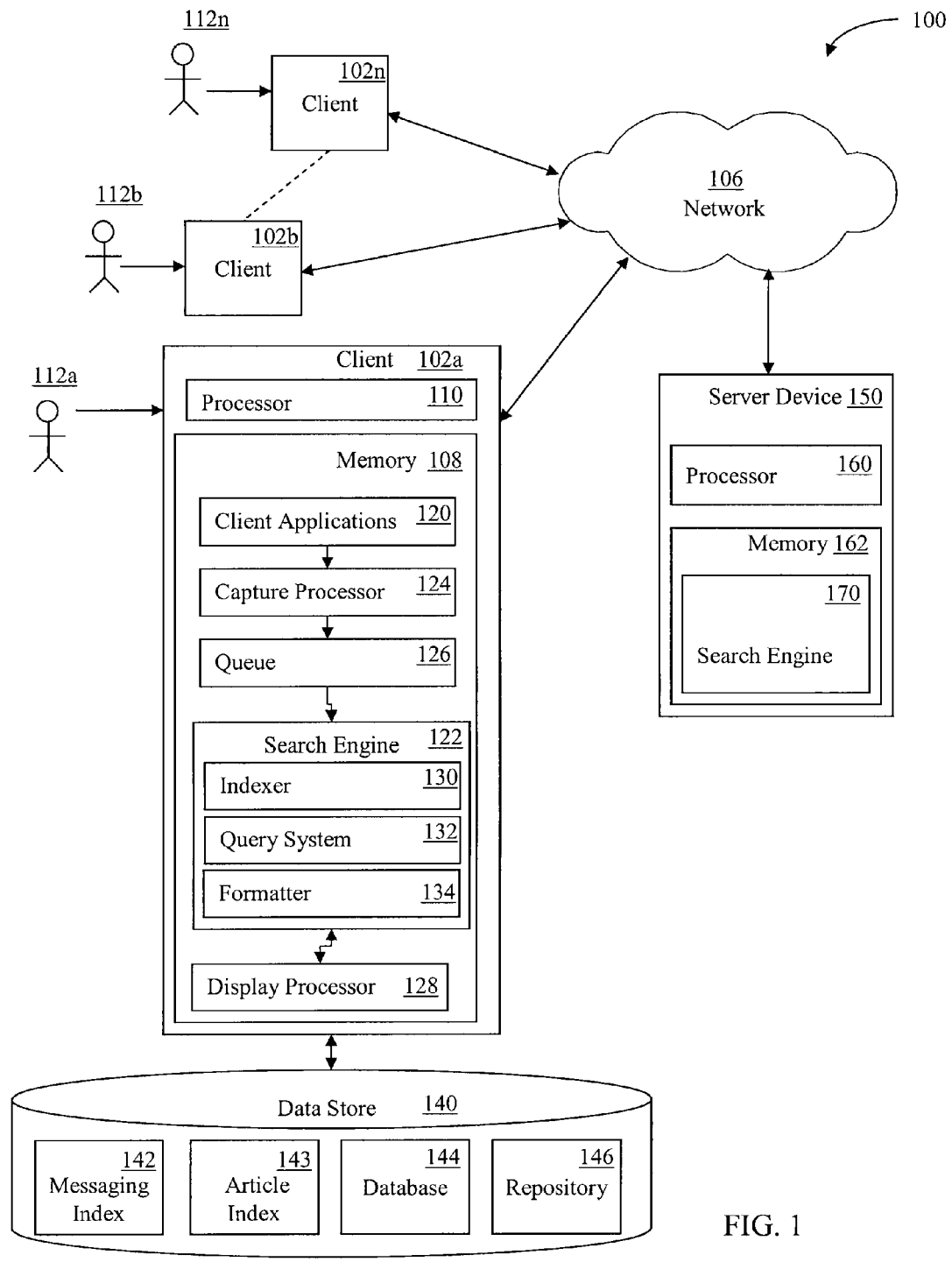
FIG. 1 is a block diagram illustrating an exemplary environment in which one embodiment of the present invention may operate.

Embodiments of the present invention provide systems and methods for generating a user interface. Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible.

The system 100 shown in FIG. 1 includes multiple client devices 102a-n in communication with a server device 150 over a network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, a document viewer application, and any other application capable of being executed by a client device.

The user 112a can interact with the various client applications 120 and articles associated with the client applications 120 via various input and output devices of the client device 102a. Articles include, for example, word processor, spreadsheet, presentation, e-mail, instant messenger, database, Internet browser, document view, and other client application program content files or groups of files, web pages of various formats, such as HTML, XML, XHTML, Portable Document Format (PDF) files, and audio files, video files, or any other documents or groups of documents or information of any type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, selecting text in an article, sending an article, receiving an article, manipulating an input device, opening an article, saving an article, closing an article, highlighting a selection within an article, hovering the mouse over words in an article, opening a client application program, closing a client application program, idle time, processor load, disk access, memory usage, and any other possible occurrence associated with an article, a client application program, or the client device whatsoever.

The memory 108 of the client device 102a shown also contains a capture processor 124, a queue 126, and a search engine 122. The client device 102a shown also contains or is in communication with a data store 140. The capture processor 124 can capture events and pass them to the queue 126. The search engine 122 requests events from the queue 126 when the search engine 122 is ready to process the events. The queue 126 may also notify the search engine 122 when events are available. When the search engine 122 receives an event it can be processed and can be stored in the data store 140. The search engine 122 can receive an explicit query from the user 112a or generate an implicit query and retrieve information from the data store 140 in response to the query.

In the embodiment shown, the capture processor 124 comprises multiple capture components. For example, the capture processor 124 shown comprises a separate capture component for each client application in order to capture event data associated with each application. In general, a capture component may monitor one or more applications, and one or more capture components may monitor a particular application. The capture processor 124 shown also comprises a separate capture component that monitors overall network activity in order to capture event data associated with network activity, such as the receipt of an instant message. The capture processor 124 shown also comprises a separate capture component that monitors overall client device performance data, such as processor load, idle time, disk access, the client applications in use, and the amount of memory available. The capture processor 124 shown also comprises a separate capture component to monitor and capture keystrokes input by the user.

The capture processor 124 can capture events in real time, termed real time events and can capture events that have occurred in the past, termed historical events. Real time events can be loading, saving, or viewing an article, such as opening a word processing document, viewing a web page, viewing an email, and saving an MP3 file, and updating the metadata of an article, such as bookmarking a web page, printing a presentation document, deleting a word processing document, and moving a spreadsheet document.

Historical events are similar to real time events except that the event occurred before the installation of the search engine 122 or was otherwise not captured, because, for example, the search engine 122 was not operational for a period of time while the client device 102a was operational. Examples of historical events include the user's saved word processing documents, spreadsheets, presentations, the emails in a user's inbox, and the web pages bookmarked by the user.

The search engine 122 shown contains an indexer 130, a query system 132, and a formatter 134. Real time events can be provided by the queue 126 to the query system 132 upon request to provide the query system 132 with information concerning current user context. The queue 126 may also notify the query system 132, and the indexer 130, when new events are available. In one embodiment, performance data is stored in a performance management system (not shown) rather than in the queue 126. The performance management system is available to any component that requires access to current performance data. The query system 132 can use information from the queue 126 to generate an implicit query. The query system 132 can also receive and process explicit queries from the user 112a.

In the embodiment shown, real time events and historical events are sent by the queue 126 to the indexer 130. In one embodiment, not all contextual real time events are indexed and these events are not sent to the indexer 130. The indexer 130 can index the indexable real time events and historical events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs. In the embodiment shown, the data store comprises a messaging index 142, an article index 143, a database 144 and a repository 146.

In the embodiment shown, a user 112a can input an explicit query into a search engine interface displayed on the client device 102a, which is received by the search engine 122. The search engine 122 can also generate an implicit query based on a current user context or state, which can be determined by the query system 132 from contextual real time events. Based on the query, the query system 132 can locate relevant information in the data store 140 and provide a result set. In one embodiment, the result set comprises articles associated with the client applications 120 or client articles. Client articles stored in the article index 143 include articles associated with the user 112a or client device 102a, such as the word processing documents, previously viewed or any other article associated with the client device 102a or user 112a. In another embodiment, the result set also comprises articles located on the network 106 or network articles located by a search engine on a server device. Network articles include articles located on the network 106 not necessarily previously viewed or otherwise referenced by the user 112a, such as web pages not previously viewed by the user 112a.

Articles stored in the messaging index 142 include one or more types of messages, such as a user's emails, chat messages, and instant messaging messages. Each time a message is received, sent, modified, printed, or otherwise accessed, a record is stored in the messaging index 142. This information can later be searched to identify messages that should be displayed in the user interface.

An embodiment of the present invention may also store message threads in the messaging index 142. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102a. The display processor 128 may comprise various components. For example, in one embodiment, the display processor 128 comprises a hypertext transfer protocol (HTTP) server that receives requests for information and responds by constructing and transmitting hypertext markup language (HTML) pages. In one such embodiment, the HTTP server comprises a scaled-down version of the Apache Web server.

Through the client devices 102a-n, users 112a-n can communicate over the network 106, with each other and with other systems and devices coupled to the network 106. As shown in FIG. 1, a server device 150 may also be coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 120 then provides the result set to the client device 102a via the network 106. The result set comprises one or more article identifiers. An article identifier may be, for example, a uniform resource locator (URL), a file name, a link, an icon, a path for a local file, or anything else that identifies an article. In the embodiment shown, an article identifier comprises a URL associated with an article.

In the embodiment shown, the server device 150, or related device, has previously performed a crawl of the network 106 to locate articles, such as web pages, stored at other devices or systems connected to the network 106, and indexed the articles in memory 162 or on another data storage device.

It should be noted that alternative embodiments of the present invention may comprise systems having different architecture than that which is shown in connection with the exemplary embodiment shown in FIG. 1. For example, in one embodiment, the server device 104 may comprise a single physical or logical server, or there may be no server. The system 100 shown in FIG. 1 is merely exemplary, and is used to explain the exemplary methods shown in FIGS. 2, 7, and 8.

Various methods may be implemented in the environment shown in FIG. 1 and other environments according to the present invention. In one embodiment of the present invention, the display processor 128 receives a first result set comprising one or more article identifiers from a messaging index in response to a search query. For example, in one embodiment, if a user 112a is editing a document and types the term "laptop" into the title, the display processor 128 receives a result set from the messaging index that includes article identifiers in the messaging index 142 that are relevant, as determined by the search engine 122, to the term "laptop." The article identifiers may include links to email threads, chat messages, instant messages, and other messaging articles.

Next, in this embodiment, the display processor 128 receives a second result set comprising one or more article identifiers from an article index in response to the search query. For example, the display processor receives a result set that includes article identifiers in the article index that are relevant, as determined by the search engine 122, to the term "laptop." The article index 143 may include, for example, an index of word-processor documents, and the article identifiers may include links to the documents.

In this embodiment, the display processor 128 next generates a user interface comprising the first article identifier and the second article identifier. The display processor may, for example, generate a an HTML document or other document that may be viewed in a browser, the document including both the article identifiers from the messaging index and the article index so that the user can easily access either or both of the articles associated with the article identifiers.

The messaging index 142 may comprise at least one of a chat message identifier, an email message identifier, an instant message identifier, or other messaging article. The messaging index 142 may comprise article identifiers for any messaging-related articles. Indexes other than an article or messaging index may also be utilized.

In one embodiment, the search query that the search engine 122 executes against the indexes is a user context-dependent search query. The context in which the user 112a is operating may be determined based on the client applications 120 that the user 112a is executing, the content of the files on which the user 112a is operating, or other activity or event occurring on the client 102a. The user context may comprise, for example, a user action history comprising a plurality of user actions. Each user action comprises various parameters, including, for example, a date/time parameter. For example, if the user 112a prints a word-processing document multiple times in a short period of time, the queries against the messaging and article indexes may be related to the content of the document the user 112a printed.

The queries against the messaging and article indexes may be created using a combination of user actions. For example, if the user prints a word-processing document and also highlights a selection of words within that document, the queries generated may be a combination of content from the entire printed document and the highlighted words.

The user interface may comprise a content display. The content display may be constructed as, for example, an HTML document, add-in, or horizontal or vertical toolbar. The display processor 128 generates the user interface with the articles identifiers. In one embodiment, the article identifiers comprise one or more of a title, URL, text snippet or thumbnail associated with the each article identifier. For example, in one embodiment, the display processor generates a user interface as an HTML document resembling a conventional search engine results page. In such an embodiment, each article identifier includes one or a combination of: a URL or path corresponding to the article, and a text snippet summarizing or otherwise associated with the article to which the article identifier refers.

One embodiment of the present invention provides a method for automatic construction and placement of the user interface. In one such embodiment, the display processor 128 receives a trigger to display a content display in a user interface, detects an area of the user interface comprising non-primary content, and creates a content display comprising an attribute associated with the area of the user interface comprising non-primary content. The attribute may comprise, for example, the size, height, width, position, transparency, or other attribute of the content display. The display processor 128 may alter the size or position of the content display when other elements in the display are moved or resized.

In one embodiment, automatically sizing and positioning the content display may comprise resizing existing windows in the display to create an area in which to create the content display. For example, if a client application is currently maximized, the display processor 128 may call that applications window restore command to clear space somewhere on the display for the content window. Alternatively, the display processor 128 may explicitly set position and size parameters for the display of a client application to make room for the content display.

Various methods of examining the physical layout of the display may be utilized by an embodiment of the present invention. For example, in one embodiment, the display processor identifies changes in pixel brightness and/or color as an indicator of where primary or non-primary content is displayed on the display. A large change in pixel brightness and/or color indicates a transition between an area where content is located and one where no content is located. In one embodiment, the largest empty section at the top of a window is located near the title bar, menu bar, and any task bars. Once an embodiment identifies an area with content, it determines whether the content is primary content or non-primary content.

For example, in one embodiment of the present invention, a display processor 128 detects an area at the top of a user interface that includes only one small area of content in a large rectangular area. The display processor 128 queries the operating system using the position of a pixel with in the small area of content to determine what is located in the identified position. The operating system provides information in response that indicates to the display processor 128 that the content comprises an application icon. The display processor 128 concludes that the content is non-primary content according to rules in the program and/or preferences provided by the user. Accordingly, the display processor 128 constructs a content display that fits within the large rectangular area comprising non-primary content. In one embodiment, the display processor 128 retrieves the position and size of all windows on the screen and calculates the areas of the screen that are not covered by any window.

One embodiment of the present invention provides methods and systems for reordering the results of searches. In one embodiment, the display processor 128 receives a request to refresh a first result set comprising a first plurality of article identifiers, receives a second result set comprising a second plurality of article identifiers, compares the first result set to the second result set, and sorts the second plurality of article identifiers in the second result set based at least in part on a sort order of the first plurality of article identifiers in the first result set. In one such embodiment, an article in the second result set is placed in the same position as that article appears in a first result set.

In one embodiment, the display processor 128 receives a request to refresh the first result set. In response, the display processor requests and receives a second result set comprising a plurality of article identifiers, identifies a first article identifier in the first plurality of article identifiers that is not in the second plurality of article identifiers, and identifies a second article identifier in the second plurality of article identifiers that is not in the first plurality of article identifiers, and replaces the first article identifier with the second article identifier in the first plurality of article identifiers.

Figure 2:
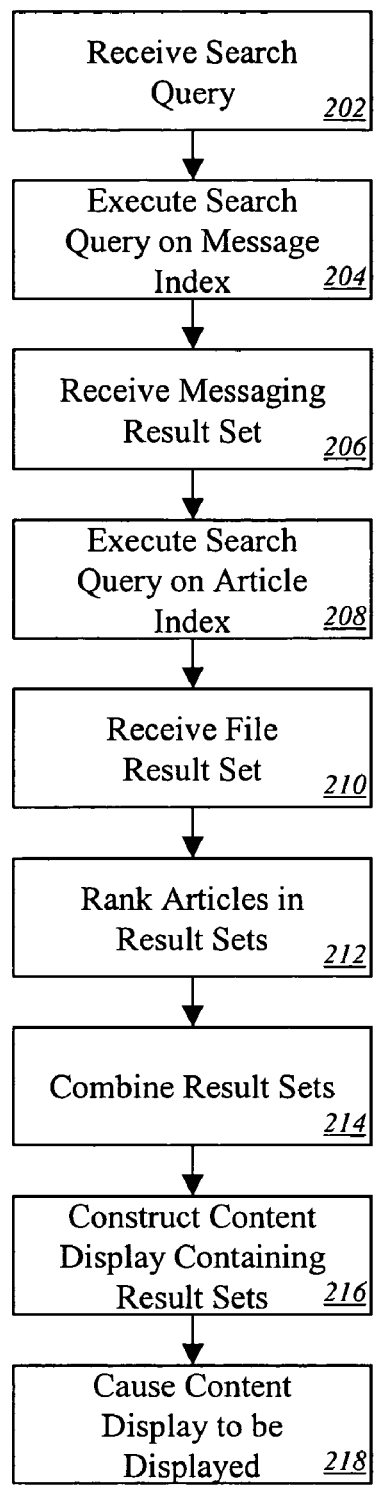
FIG. 2 is a flowchart illustrating generating a user interface in one embodiment of the present invention.

FIG. 2 is a flowchart illustrating generating a user interface in accordance with one embodiment of the present invention. In the embodiment shown, the query system 132 receives a search query 202. The query may be an explicit query, e.g., a query entered by a user 112a in a text box, or the query may instead be an implicit query generated by a client application 120 in response to events associated with the user 112a, for example, information being entered by or output to the user. The query or the response to the query may additionally depend on user context. For example, the response to the query may depend on the time of day the query is run or on previous or a sequence of previous actions by the user. In one embodiment, the current user context is derived from a data store comprising a history of user actions, such as printing or opening a file, or sending an email message.

In response to receiving the query, the query system 132 executes the search query on a messaging index 142 stored in the data store (140) 204. The query system 132 then receives the result set from the messaging index 206. The messaging index may comprise information regarding, for example, chat messages, emails, and instant messages. The result set comprises one or more article identifiers and may comprise snippets or text summaries of the article with which the article identifier is associated.

The query system 132 then executes the search query on an article index stored in the data store (140) 208. The query system 132 receives the result set from the article index 210. The result set comprises one or more article identifiers that satisfy the search query. In the case of a file, the article identifier may be a fully qualified path. The query system 132 then ranks the article identifiers in each of the two result sets 212 (this may be done separately and then combined or combined and then ranked). The query system 132 may perform queries on additional indexes, such as an index comprising news articles or any other type of document or file that can be indexed. The query system 132 may also cause queries to be executed on indexes not stored on the client 102a or in the data store 140. For example, in one embodiment, the query system 132 causes queries to be executed on the search engine 170.

In the embodiment shown, the query system 132 transmits the result sets to the display processor 128, which combines the result sets 214. The display processor 128 may combine the result sets into one comprehensive list or may combine the result sets into one interface (shown together or separately). In one embodiment in which the result sets are combined into one interface but not into an integrated list, the display processor 128 creates tabs on the user interface into which the article identifiers are arranged. The tabs may include, for example, an email tab, an instant message tab, a web page tab, a news tab, and/or a file tab.

In the embodiment shown, the display processor 128 next constructs a content display comprising the two result sets 216. The content display may comprise text describing the article identifier, a thumbnail image of the article, or any other information that would be useful to the user 112a in identifying a potentially relevant result. The display processor then causes the content display to be displayed 218. The functions described may be performed by other components of an embodiment of the present invention. For example, in one embodiment, the query system 132 and display processor 128 are combined, and the combined component performs functions to facilitate execution of queries, ranking of result sets, and causing the display of the combined results. Other configurations are also possible.

The content display that the display processor 128 constructs in step 216 of FIG. 2 may take of a number of forms. For example, in one embodiment, the display processor 128 constructs an HTML document comprising various sections, each section comprising results from a different index. In another embodiment, the information from various indexes is combined into a single, integrated listing. The display may be periodically updated (e.g., daily) or updated substantially continuously.

Figure 3:
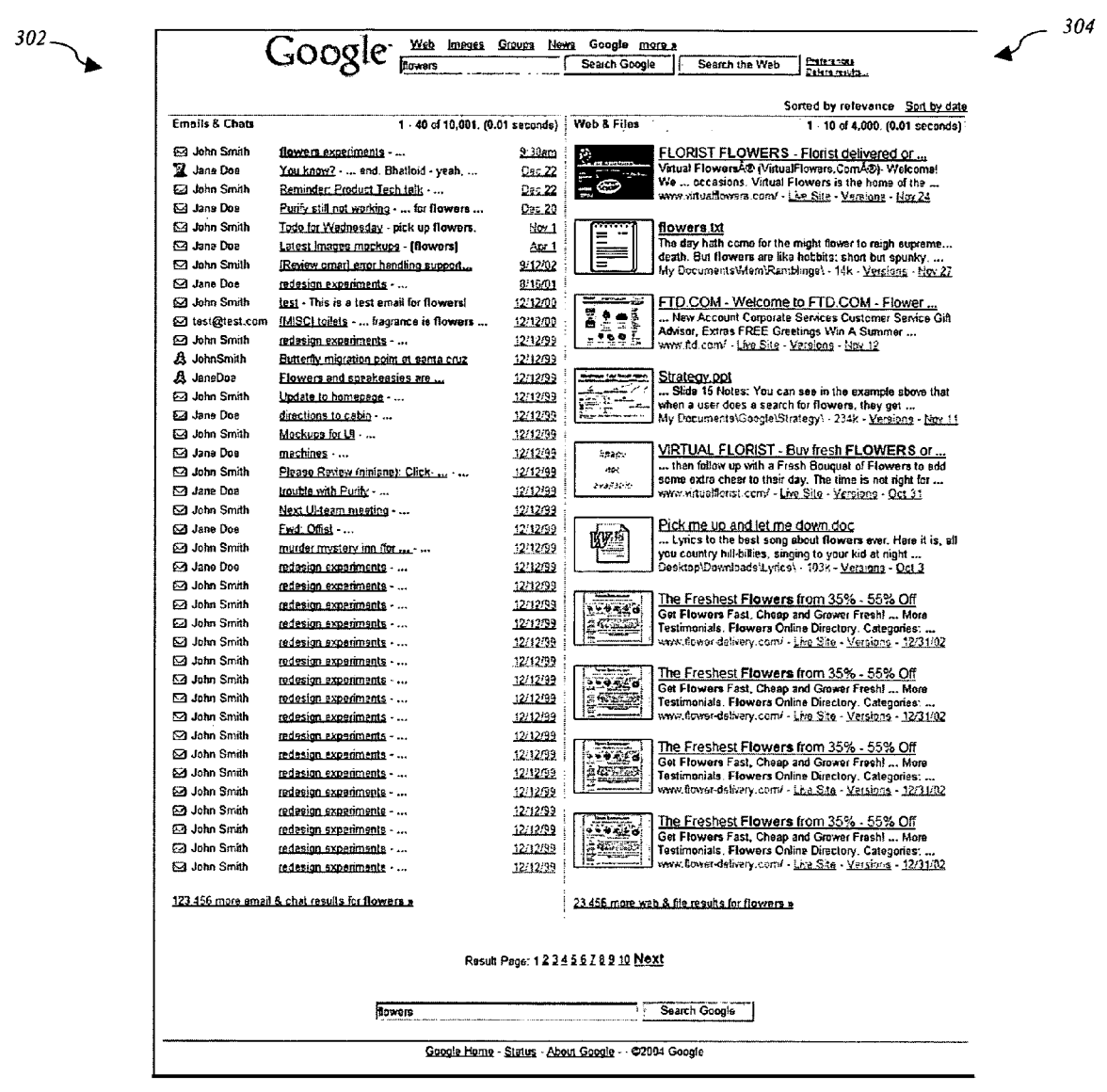

FIG. 3 is a screen shot illustrating information displayed in an HTML document in one embodiment of a content display 301 constructed according to the method shown in FIG. 2. The content display 301 shown comprises an HTML document. The HTML document 301 comprises two sections.

The first section 302 comprises a result set comprising email threads retrieved from a messaging index 142. The article identifiers are retrieved from the messaging index 142 as described in relation to steps 204 and 206 in FIG. 2. In the embodiment shown, the email thread comprises a series of related messages. The messages may be related by sender, recipient, subject, and/or content of the message, or based on other attributes of the message. Taken together, the email messages form a thread, a type of article or document that the user 112a can access. In another embodiment, messages may be shown in this section; the messages may or may not be email messages or threads.

The result set in the shown in the first section 302 also comprises chat messages or chat message threads retrieved from a messaging index 142. The email and chat messages may be retrieved simultaneously by the search engine 122 or may be retrieved separately by repeating steps 204 and 206 for each section type.

The second section comprises a result set or a portion of a result containing results from the Internet 304. In the process illustrated in FIG. 2, the Internet represents a remote article index. In another embodiment, the Internet represents results from an index of pages viewed in the past as described in relation to steps 208 and 210.

The second section 304 of the embodiment shown also comprises a result set comprising files retrieved from an article index 143. The search engine 120 may retrieve the article identifiers associated with both the files and other articles in a single step. Alternatively, the search engine 120 may execute steps 208 and 210 repeatedly to retrieve various types of articles.

The two sections 302, 304 and the layout of the display shown in FIG. 3 are merely exemplary of how an HTML document may be constructed according to the present invention. For example, a user 112a may select different, fewer, or additional categories to display on the HTML document. In one embodiment, the user 112a accesses an administration page to vary the layout of the HTML document shown in FIG. 3 as desired.

Figure 4:
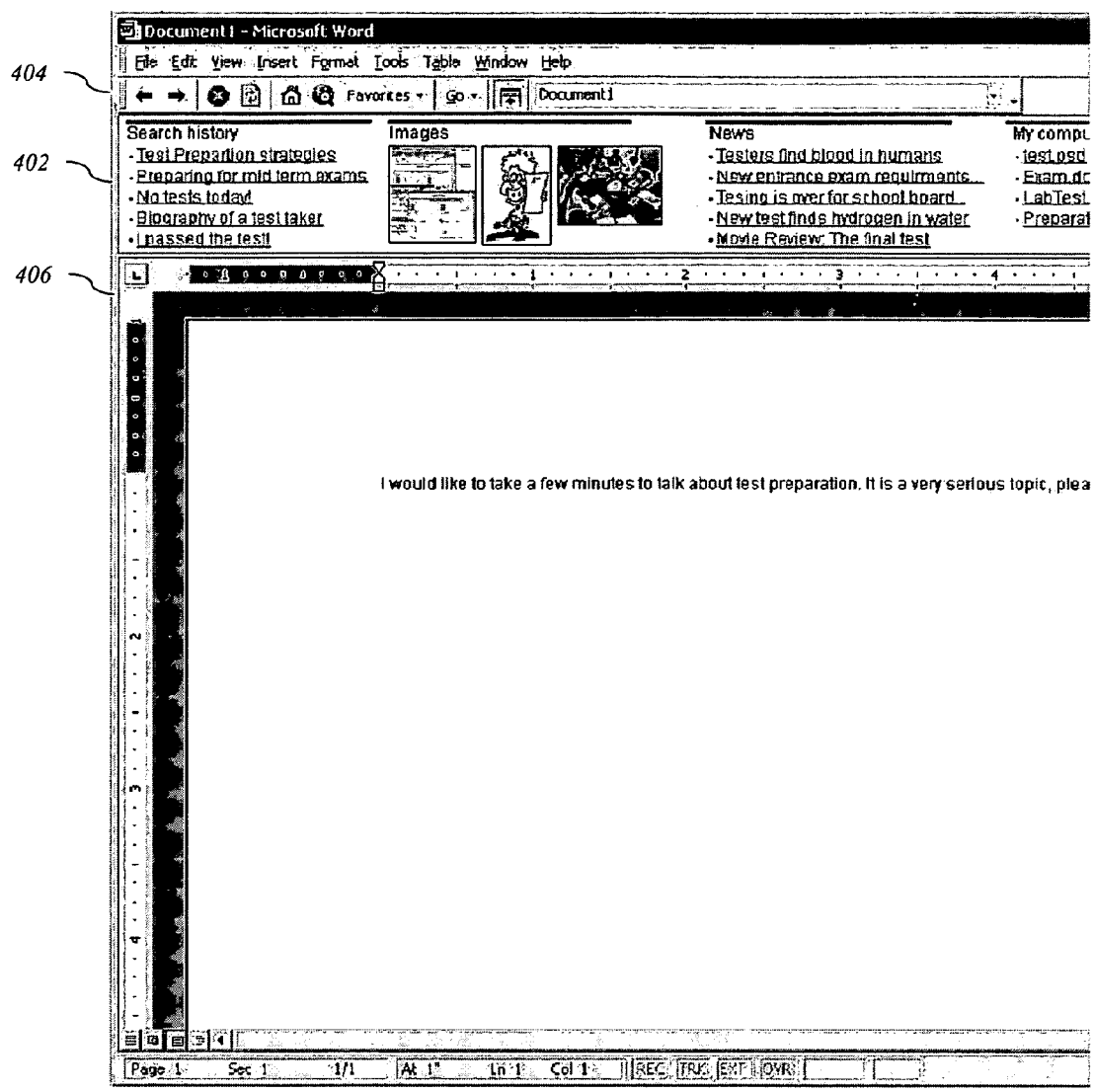
FIG. 4 is a screen shot illustrating information displayed in a Microsoft® Word toolbar in one embodiment of the present invention.

An embodiment of the present invention may construct the content display as a part of another application. For example, many products that execute within the Microsoft® Windows environment include a toolbar. These applications often include the capability to support add-ins. FIG. 4 is a screen shot illustrating a content display 402 according to one embodiment of the present invention constructed as a Microsoft® Word toolbar.

In the embodiment shown, the display processor 128 constructs a content display 402 that appears as an add-in in Microsoft® Word. The display processor executes the steps in FIG. 2 to retrieve article identifiers from the messaging index 142 according to steps 204 and 206, and article identifiers from the article index 143 according to steps 208 and 210. As described in relation to FIG. 3, the steps shown in FIG. 2 may be executed in various orders and any of the steps may be repeated alone or in combination with other steps to generate the content display shown in FIG. 3. The display may appear as an add-in to other applications, such as Microsoft® Excel, Microsoft® Powerpoint, Microsoft® Internet Explorer, or other products.

The content display 402 shown is a vertical representation of the various data. The content display 402 appears between the last toolbar 404 and the document displayed 406. The content display 402 may be displayed in various sections of the application window in embodiments of the present invention.

In the embodiment shown, the content display 402 appears as a standard add-in. In another embodiment, the display processor 128 constructs the content display 402 so that it appears similar to the one shown in FIG. 4. However, rather than causing the display to be displayed as an add-in, the display processor 128 causes the content display 402 to be shown in the same spot as an add-in would normally be shown, displacing any portion of the application that would be obscured by the content display 402. For example, in one application that does not support add-ins, the display processor determines the position of the title bar 404 and of the content screen of the application, section 406 in the embodiment shown, and causes the content display 402 to be shown between the two sections. The display processor 128 automatically repositions the content display 402 when the application is moved or resized. In another embodiment, the content display may overlay a region of the current window or screen, without displacing any content. For example, the content display may appear in the titlebar, menubar, or toolbar region of the window where no content is displayed.

Figure 5:
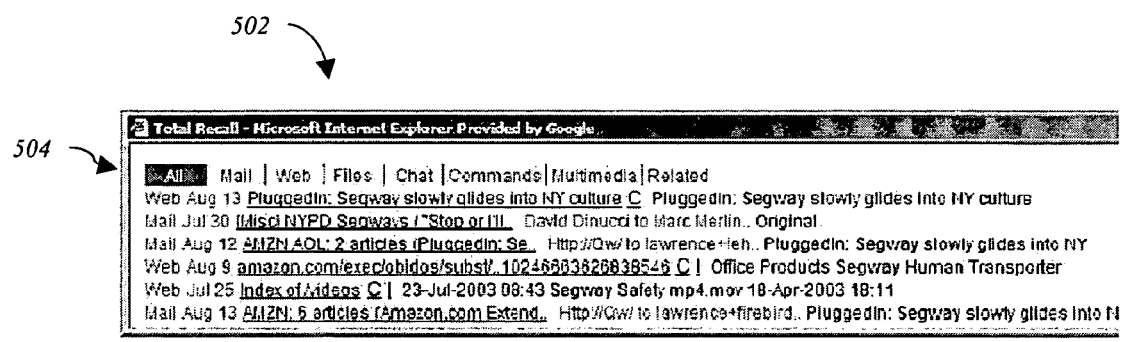
FIG. 5 is a screen shot illustrating information displayed in a floating title bar in one embodiment of the present invention.

FIG. 5 is a screen shot illustrating information displayed in a floating title bar in one embodiment of a content display constructed according to methods of the present invention. In the embodiment shown, the title bar 502 comprises information retrieved from the messaging 142 and article indexes 143 according to the process shown in FIG. 2. The information in the embodiment shown is constructed so as to be displayed horizontally. The content display 502 includes a series of tabs 504 that allow a user 112a to select the information to be displayed. For example, in the embodiment shown, the user 112a can select from All, Mail, Web, Files, Chat, Commands, Multimedia, and Related tabs. Each of the tabs corresponds to the type of information to be displayed in the content display 502. As described in relation to FIG. 2, the display processor may repeat the steps 204-210 in FIG. 2 for each type of content to be displayed or may instead execute the steps in FIG. 2 and then determine appropriate categories in which to place each of the resulting article identifiers. In one embodiment, the floating window overlays empty or non-primary content in the titlebar/menubar, and/or taskbars in an application window.

Although in the embodiment shown in FIG. 5 the display processor 128 constructs the title bar 502 to be displayed horizontally, in one embodiment of the present invention, the display processor 128 constructs the title bar 502 so that it may be displayed vertically, e.g., along the right side of the display area on the screen. Such an embodiment may include vertical or horizontal tabs or may instead include sections for each of the types of data shown. The title bar 502 may be adjustable in size by the user, such that its width and height may be changed via dragging by the mouse or some other mechanism to be different from its original settings.

Figure 6:
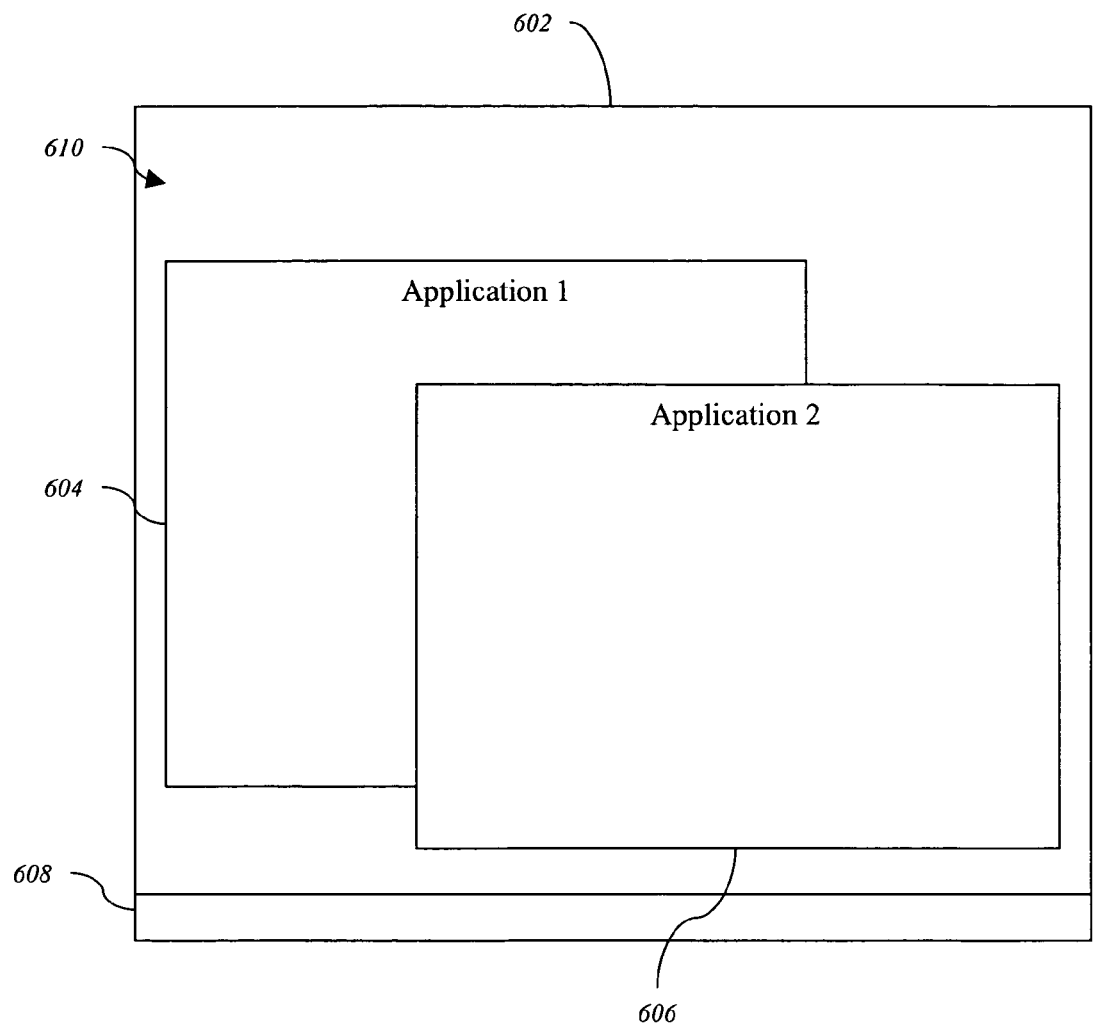
FIG. 6 is a block diagram of a user display in one embodiment of the present invention.
Figure 7:
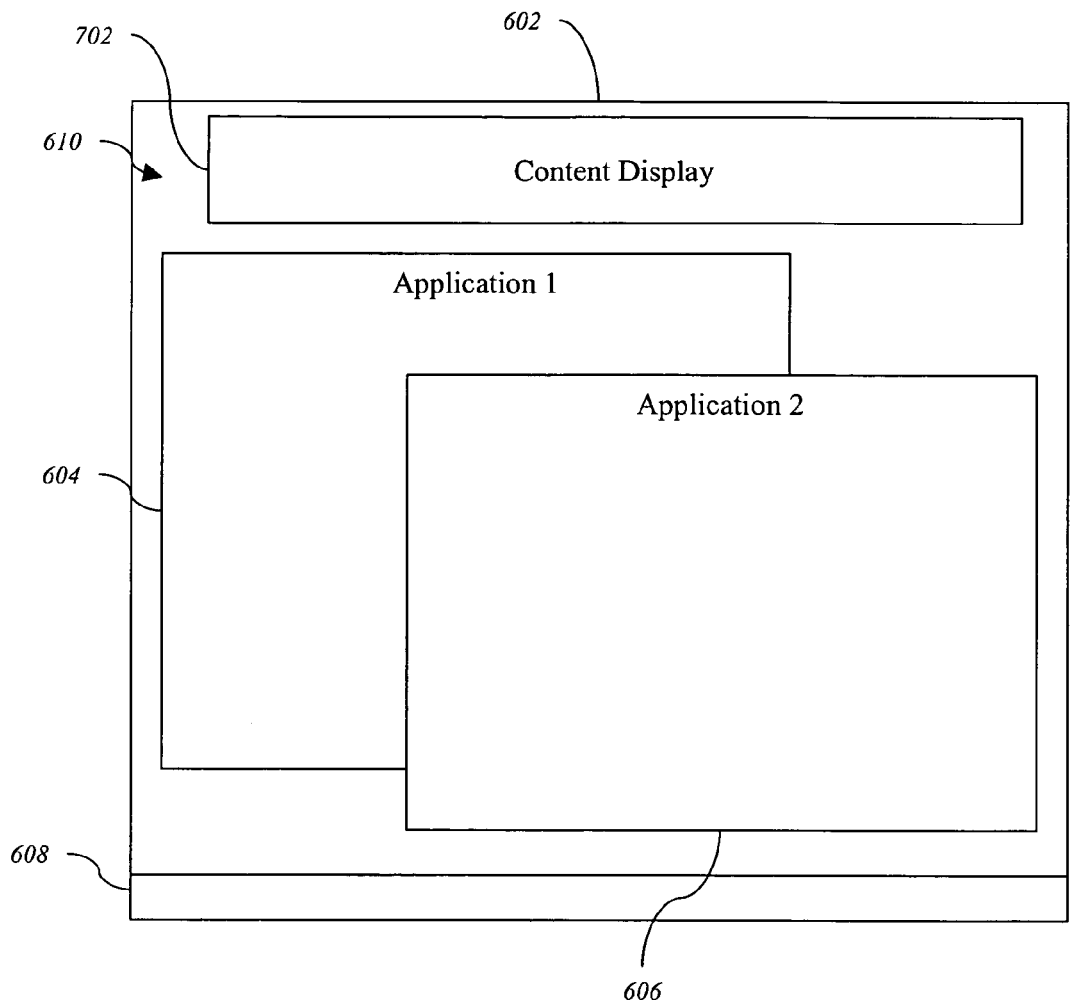
FIG. 7 is a block diagram of a user display including a content display in one embodiment of the present invention.
Figure 8:
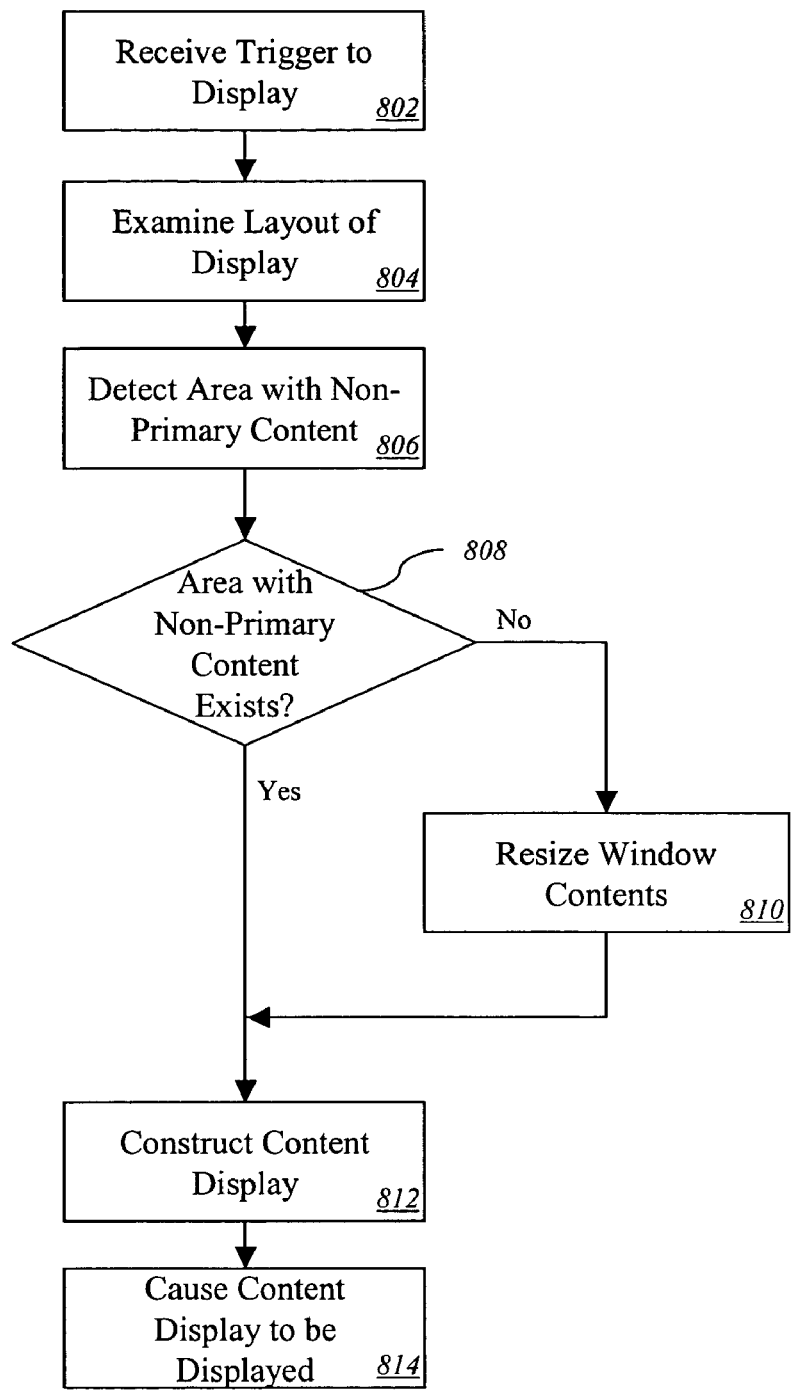
FIG. 8 is a flowchart illustrating a process for identifying available screen area and sizing the content display accordingly in one embodiment of the present invention.

In one embodiment of the present invention, the display processor automatically constructs the user interface page based on the space available on the display screen. In one such embodiment, the display processor attempts to identify a section of the screen in which non-primary content is displayed. The display processor 128 then constructs the page to fit in the space. FIGS. 6 through 8 illustrate one method to allow for such fit-to-space construction.

FIG. 6 is a block diagram of a computer display comprising areas with and without primary content in one embodiment of the present invention. Areas of the display are described as having non-primary content. Non-primary content areas may include, for example, areas with no, little, irrelevant, rarely- or infrequently-used, background, or unused content. The present or absence of primary content will depend on the circumstances and application. For example, such non-content areas may comprise areas in which the computer desktop is viewable beside or around an application of interest (such as the open window of a word processor). Another example of a non-content area may comprise an area within the window of an application of interest that has not been used by the user in a predetermined amount of time.

In the embodiment shown in FIG. 6, a display 602 currently comprises two application windows 604, 606. The first window 604 comprises Application 1 (such as a word processor), and the second window 606 comprises Application 2 (such as an Internet browser). The display 602 also comprises a menu bar 608. These areas 604, 606, and 608 have content (such as text and graphics) present that the user uses in interacting with the applications (such as pull-down menus, menu bars, and other items associated with conventional word processors and Internet browsers).

The display 602 includes a number of areas in which non-primary content is present. The largest of these areas is at the top of the screen 610. In one embodiment, the display processor 128 is able to construct a content display to fit in the area 610 that does not include any content. The non-primary area mentioned 610 comprises an area in which only the desktop of an operating system is seen (e.g., icons and background graphics). In other embodiments, other types of non-primary area are present in this area 610.

It should be noted that, in certain embodiments, the operational definition of non-primary area may be changed by the user, by an application, or otherwise. For example, the user may initially select that only areas in which only the desktop is viewable is considered a non-primary area for a certain time or use. The user may later select that, in addition to such an area, areas that contain content that has not been accessed by the user within a pre-defined time period (e.g., one hour) is considered non-primary area. Other adjustments may be made, and these are meant to be only illustrative.

FIG. 7 is a block diagram of the user display shown in FIG. 6 including a content display in one embodiment of the present invention. In the embodiment shown, the display processor 128 has identified an area at the top of the display in which the content display 702 may be placed. Accordingly, the display processor sizes and positions the content display 702 to fit in the area with non-primary content 610.

In one embodiment of the present invention, the display processor 128 uses the following method to locate a position to display a content window overlaying the titlebar/menubar/taskbars of an application window:

whenever there is a change in the size or position of the currently focused window, or a change in the content of the window near a content display, or the user switches to a different window then the following analysis is performed to locate the position to display the content window: If the window is large enough to accommodate the minimize sized content display then the display processor retrieves an image of the focused window, including the titlebar/menubar/taskbar region.

For each row in the retrieved image from the top to the maximum height of the content display or until the row cannot accommodate a content display of the minimum width, perform the following: find the widest region where the change in pixel brightness and/or color over a specified range (typically a small number of pixels) does not exceed a threshold. For example, in one such embodiment, the threshold is equal to the sum of the absolute values of the differences between the R, G, and B values of the pixels. Next, analyze the widest regions from each line to find the best size of the content display. Typically, the higher the window is, the less wide it can be as since toolbars often include more content on toolbars at lower points.

In one embodiment, the content display remains rectangular. In such an embodiment, the content display is either narrow and tall or shorter and allowing it to be wider. A heuristic may be used to choose the best size.

In one embodiment of the present invention, the display processor 128 consults a list of preferences or pre-defined areas that affect the display of the content window. For example, in one embodiment, the display processor 128 accesses a list of windows to never show the content display on (blacklist), a list of windows to show the content display on (whitelist), and/or a list of windows to limit the height of the content display to specified values. The display processor 128 may rely on other attributes of the display to determine how to create the content display window. For example, in one embodiment, the display processor 128 identifies entry fields in dialog boxes and avoids having the content display overlap these fields.

FIG. 8 is a flowchart illustrating a process for identifying available screen area and sizing the results window accordingly in one embodiment of the present invention. In the embodiment shown, the display processor 128 receives a trigger to display a content display (such as those shown in FIGS. 3, 4, and 5) 802. The trigger may comprise, for example, the passage of a predetermined time period or a notification that a window in the user interface has been resized. In response, the display processor 128 examines the current layout of the computer display 804. The layout of the computer display comprises the layout of the windows comprising primary and non-primary content, as well as the background and any icons or other elements in the display. Primary content comprises, for example, windows in which the user is actively or has recently been working, toolbars that are active or have recently been active, and any other content that is identified as content that should not be covered by the content display. The display processor 128 searches for and detects an area with non-primary content if such an area exists 806. The area with non-primary content may, for example, comprise only background or may comprise background and application program icons. In one embodiment, the area with non-primary content comprises an application window that has been inactive for more than a predetermined time period, e.g., five minutes.

The display processor 128 may detect an area with non-primary content in a variety of ways. For example, in one embodiment, the display processor 128 evaluates the color and/or brightness of the pixels within the display to detect changes. In one such embodiment, the display processor 128 determines the color of the background and then evaluates pixels to detect pixels that comprise a color different than the background color. If the display processor 128 detects such a pixel, it concludes that content exists in that pixel. If the color is the same as the background, the display processor 128 detects an absence of content.

If the display processor 128 detects content, then the display processor 128 must further determine whether the content is primary content. The display processor 128 may determine whether content is primary by locating a pixel with content and then using the position of the pixel to determine what type of content is displayed at that position. For example, the display processor 128 may make an operating system call to determine which application or applications are displaying content at the position. The display processor 128 then uses the supplied information to make a determination of whether or not the content is primary.

In another embodiment, the display processor 128 evaluates the color and/or brightness intensity of various pixels. Large or sudden changes in intensity between pixels or over a range covering a specified size or number of pixels indicate that content may be present in the more intense pixel. For example, there are often large changes in color and/or intensity at the edges of characters. The background may change smoothly to show a shaded appearance—by looking for large or sudden changes we are able to ignore relatively slow gradual changes as typical for backgrounds. Anti-aliasing may cause the color and/or intensity to vary smoothly at the edge of items like characters, in which case it may be necessary to analyze the change over a range of a specified size or number of pixels (typically a small size or number of pixels).

The display processor 128 evaluates the changes in color or brightness to determine the outer perimeter of each of the elements displayed on the screen. In this way, the display processor 128 is able to determine the areas with no or with non-primary content.

In other embodiments, the display processor 128 may evaluate the length of time since functionality in an area has been used by the user 112a in order to determine whether an area is primary or non-primary. In still other embodiments, the display processor 128 may identify areas containing only background (such as the computer desktop). In still further embodiments, the display processor 128 may identify non-primary areas by designations provided by a user of the computer. These are only examples of some of the ways to identify primary and/or non-primary areas in accordance with the present invention, and many other ways may be used. For example, in yet another embodiment, the display processor 128 evaluates both the color and intensity of pixels to identify primary areas.

Referring still to FIG. 8, display processor 128 determines whether or not an area exists with non-primary content 808. In the embodiment shown, if no such area exists, the display processor 128 resizes the existing application windows comprising primary content to create an area with non-primary content 810. For example, the display processor 128 may execute an applications window restore method to cause the application to be non-maximized. Once the area with non-primary content is detected or created, the display processor 128 creates the content display, an attribute of the content display, such as the height, width, position, transparency (e.g., displayed in a way so that objects behind the content display, such as icons, can be seen by the user), or other attribute of the content display, the attribute associated with the size of the area of the display with non-primary content 812. The display processor 128 then causes the content display to be displayed in the area comprising non-primary content 814.

If the display processor 128 detects multiple areas with non-primary content, the display processor selects the most appropriate area in which to create the content display. The appropriateness of an area may be determined based on a variety of factors. For example, in one embodiment, the display processor 128 selects the largest area with no content in which to create the content display. In another embodiment, the display processor 128 selects an area on the right or left side of the computer display to construct the content display. The relative appropriateness of various areas may be determined when the display processor is programmed or may be based on user-supplied preferences. For example, a user 112a may indicate a preference for a content display arranged vertically on the right-hand side of the screen.

The display processor 128 may also vary the parameters of the displayed content depending on the available space. For example, in one embodiment, the display processor causes the content display to be semi-transparent so that a user can see an application executing behind the content window.

The computer display 602 shown in FIG. 7 provides an illustrative display on which the process shown in FIG. 8 may operate. The display processor 128 first identifies the layout of the screen and is able to determine the perimeter of the Application 1 window 604, the Application 2 window 606, and the toolbar 608. Based on the analysis, the display processor determines that the top section of the screen has an area with non-primary content 610. The display processor 128 then constructs a content display 702, the height, width, and position of the content display 702 based at least in part on the size and dimensions of the area with non-primary content 610.

The information displayed in the content display 702 of FIG. 7 may be generated in various ways in embodiments of the present invention. For example, in one embodiment, the information in the content display 702 is generated according to the method shown in FIG. 2. Article identifiers from the messaging index 142 and from the article index 143 are displayed in the content display 702. The number of articles identifiers displayed and the layout of the sections of the content display 702 may vary according to the size of the content display 702 that is constructed. In one embodiment, the number of article identifiers displayed and the layout of the article identifiers within the content display 702 is affected by both the size of the content display 702 and by previously supplied user preferences.

In one embodiment of the present invention, the content of the content display may be refreshed periodically. Refreshing may occur substantially continuously or may be performed after a period of inactivity, e.g., ten minutes. In order to provide an effective user interface to the user, the display processor 128 according to the present invention reorders the results displayed in the content display. For example, in one embodiment, the display processor 128 maintains a relatively consistent listing of the article identifiers as the list is refreshed.

Figure 9:
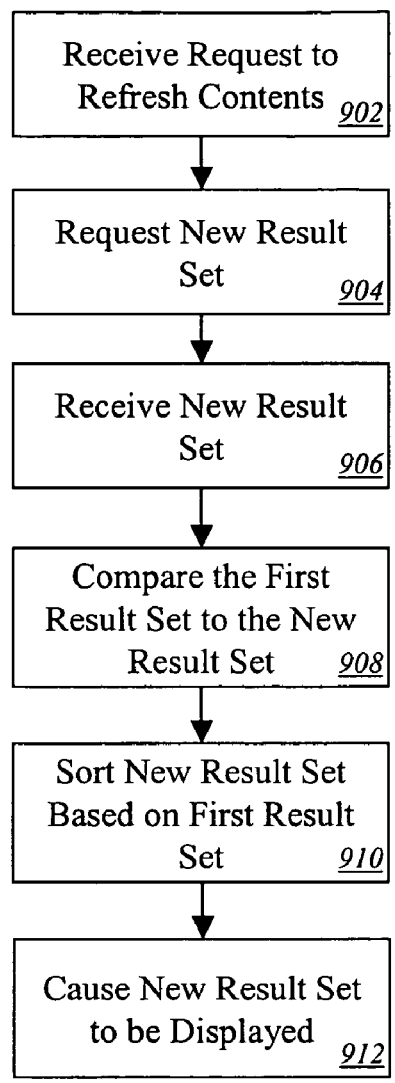
FIG. 9 is a flowchart illustrating a process or reordering a result set in one embodiment of the present invention.

One embodiment of the present invention reorders the results presented to the user 112a based on the context of the content display. FIG. 9 is a flowchart illustrating a process for reordering a result set in one embodiment of the present invention. In the embodiment shown, the display processor 128 receives a request to refresh a result set displayed in a window 902. The result set comprises a plurality of article identifiers. In response, the display processor 128 issues a request for a new updated result set 904. The request may be sent to the search engine 122 on the client or the search engine 170 on the server device 104. The display processor receives a new result set in response to the query 906.

The display processor 128 compares the new result set to the first result set 908. For example, the display processor 128 may determine how many of the article identifiers in the second set are different from the article identifiers in the first set. The display processor may further determine the position of article identifiers that exist in both result sets. In the embodiment shown, the display processor sorts 910 the results returned in the new result set based at least in part on the order of the results shown in the first result set.

For example, if an article identifier exists in both result sets and is displayed in the third position in the currently-displayed result set and in the fourth position in the new result set, the display processor may move the article identifier to the third position in the new result set. In this way, the display processor maintains consistency for the user 112a. Once the display processor 128 has sorted the new result set, the display processor 128 causes the new result set to be displayed 912.

In another embodiment of the present invention, the display processor 128 compares the two result sets and then replaces article identifiers in the currently displayed result set with article identifiers in the new result set. For example, if the third article identifier in the currently displayed list does not appear in the new result set, the display processor may replace the third article identifier with a newly-identified article identifier in the new result set. Such a process also helps to maintain consistency in the user interface for the user. In one embodiment, the display processor 128 is able to vary the rules for replacing results in the currently displayed result set based on actions by the user 112a. For example, if the user 112a does not click on or otherwise select or indicate an interest in a particular result after the result is displayed for a certain period of time, the display processor removes the result from the displayed set.

Embodiments of the present invention may incorporate additional features as well. For example, in one embodiment of the present invention, the display processor 128 supports a set of application programming interface (API) calls. In this embodiment, application running on the client 102a, such as the web server, is able to call an API to display information according to an embodiment of the present invention, such as those exemplary methods set out above. The API may also provide the capability of formatting the result set in HTML, XML, or any other format required by the user.

One embodiment of the present invention comprises an administration page. The user 112a clicks on an icon that provides access to the administration page. In one such embodiment, the user is able to set preferences for display, such as the minimum size of the window, the type of window to be displayed, the type of content to include, and various other parameters that may or may not relate to display, such as refresh rate, etc.

The foregoing description of the exemplary embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method performed by computer-executable instructions executed by a processor, comprising:
   the executed instructions detecting, within an existing application window displaying application-specific content on a display of a computer, an area of the window comprising non-primary content by locating, within a row of pixels in the window, a widest pixel region where a change in at least one of pixel color and pixel brightness is less than a predetermined threshold;
   the executed instructions creating a content display comprising an attribute, the attribute associated with the area of the window comprising the non-primary content;
   the executed instructions obtaining query search results in response to execution of a query;
   the executed instructions causing the content display to be displayed; and
   the executed instructions displaying the query search results within the content display.

2. The method of claim 1, wherein detecting the area of the window comprising the non-primary content comprises examining a layout of the window.

3. The method of claim 1, wherein the non-primary content comprises no content.

4. The method of claim 1, wherein the non-primary content comprises background content.

5. The method of claim 1, wherein detecting the area of the window comprising the non-primary content comprises determining whether the area has been used within a predetermined period of time.

6. The method of claim 1, wherein the non-primary content comprises an icon.

7. The method of claim 1, wherein the attribute comprises a size.

8. The method of claim 1, wherein the attribute comprises a position.

9. The method of claim 1, wherein the attribute comprises transparency.

10. The method of claim 1, further comprising:
    detecting a change in the area of the window comprising the non-primary content; and
    modifying the attribute based at least in part on the change in the area of the comprising the non-primary content.

11. The method of claim 1, further comprising:
    locating, for each of a plurality of rows of pixels in the window, a widest pixel region where a change in at least one of pixel color and pixel brightness is less than a predetermined threshold; and
    determining a size of the content display by analyzing the widest pixel regions from the plurality of rows.

12. The method of claim 1, wherein the application-specific content comprises a set of graphical user interface elements, the method further comprising determining an outer perimeter of each of the elements by evaluating changes in at least one of pixel color and pixel brightness.

13. The method of claim 1, further comprising:
    detecting a resize of the application window causing a change in the area of the application window comprising the non-primary content;
    altering a size of the content display; and
    causing the content display to be redisplayed at the altered size.

14. The method of claim 1, further comprising:
    detecting a resize of the application window causing a change in an amount of available space within the application window;
    responsive to detecting the resize, altering a transparency attribute of the content display; and
    causing the content display to be redisplayed according to the altered transparency attribute.

15. A non-transitory computer-readable storage medium on which is encoded executable program code, the program code comprising:
    program code for detecting, within an existing application window displaying application-specific content on a display of a computer, an area of the window comprising non-primary content by locating, within a row of pixels in the window, a widest pixel region where a change in at least one of pixel color and pixel brightness is less than a predetermined threshold;
    program code for creating a content display comprising an attribute, the attribute associated with the area of the window comprising the non-primary content;
    program code for obtaining query search results in response to execution of a query;
    program code for causing the content display to be displayed; and
    program code for displaying the query search results within the content display.

16. The computer-readable medium of claim 15, wherein the program code for detecting the area of the window comprising the non-primary content comprises program code for examining a layout of the window.

17. The computer-readable medium of claim 15, further comprising:
    program code for detecting a change in the area of the window comprising the non-primary content; and
    program code for modifying the attribute based at least in part on the change in the area of the window comprising the non-primary content.

18. The computer-readable storage medium of claim 15, wherein the non-primary content comprises no content.

19. The computer-readable storage medium of claim 15, wherein the non-primary content comprises background content.

20. The computer-readable storage medium of claim 15, wherein detecting the area of the window comprising the non-primary content comprises determining whether the area has been used within a predetermined period of time.

21. The computer-readable storage medium of claim 15, wherein the non-primary content comprises an icon.

22. The computer-readable storage medium of claim 15, wherein the attribute comprises a size.

23. The computer-readable storage medium of claim 15, wherein the attribute comprises a position.

24. The computer-readable storage medium of claim 15, wherein the attribute comprises a transparency.

25. The computer-readable storage medium of claim 15, the program code further comprising:
    program code for locating, for each of a plurality of rows of pixels in the window, a widest pixel region where a change in at least one of pixel color and pixel brightness is less than a predetermined threshold; and
    program code for determining a size of the content display by analyzing the widest pixel regions from the plurality of rows.

26. The computer-readable storage medium of claim 15, wherein the application- specific content comprises a set of graphical user interface elements, the program code further comprising program code for determining an outer perimeter of each of the elements by evaluating changes in at least one of pixel color and pixel brightness.

27. The computer-readable storage medium of claim 15, the program code further comprising:
    program code for detecting a resize of the application window causing a change in the area of the application window comprising the non-primary content;
    program code for altering a size of the content display; and
    program code for causing the content display to be redisplayed at the altered size.

28. The computer-readable storage medium of claim 15, further comprising:
    program code for detecting a resize of the application window causing a change in an amount of available space within the application window;
    program code for responsive to detecting the resize, altering a transparency attribute of the content display; and
    program code for causing the content display to be redisplayed according to the altered transparency attribute.

29. A computer system comprising:
    a computer processor; and
    a computer-readable storage medium storing instructions that when executed by the processor perform actions comprising:
        detecting, within an existing application window displaying application-specific content on a display of a computer, an area of the window comprising non-primary content by locating, within a row of pixels in the window, a widest pixel region where a change in at least one of pixel color and pixel brightness is less than a predetermined threshold, the non-primary content comprising at least one of a background, a title bar, a menu bar, a toolbar, and a task bar;
        creating a content display containing search results; and
        causing the content display to be displayed within the detected area.

30. A computer system comprising:

a computer processor; and a computer-readable storage medium storing instructions that when executed by the processor perform actions comprising:

detecting, within an existing application window displaying application-specific content on a display of a computer, an area of the window comprising non-primary content by locating, within a row of pixels in the window, a widest pixel region where a change in at least one of pixel color and pixel brightness is less than a predetermined threshold;

creating a content display comprising an attribute, the attribute associated with the area of the window comprising the non-primary content;

obtaining query search results in response to execution of a query;

causing the content display to be displayed; and displaying the query search results within the content display.

31. The system of claim 30, wherein detecting the area of the window comprising the non-primary content comprises examining a layout of the window.

32. The system of claim 30, wherein the non-primary content comprises no content.

33. The system of claim 30, wherein the non-primary content comprises background content.

34. The system of claim 30, wherein detecting the area of the window comprising the non-primary content comprises determining whether the area has been used within a predetermined period of time.

35. The system of claim 30, wherein the non-primary content comprises an icon.

36. The system of claim 30, wherein the attribute comprises a size.

37. The system of claim 30, wherein the attribute comprises a position.

38. The system of claim 30, wherein the attribute comprises a transparency.

39. The system of claim 30, the actions further comprising:

detecting a change in the area of the window comprising the non-primary content; and modifying the attribute based at least in part on the change in the area of the window comprising the non-primary content.

40. The system of claim 30, the actions further comprising:

locating, for each of a plurality of rows of pixels in the window, a widest pixel region where a change in at least one of pixel color and pixel brightness is less than a predetermined threshold; and determining a size of the content display by analyzing the widest pixel regions from the plurality of rows.

41. The system of claim 30, wherein the application-specific content comprises a set of graphical user interface elements, the actions further comprising determining an outer perimeter of each of the elements by evaluating changes in at least one of pixel color and pixel brightness.

42. The system of claim 30, the actions further comprising:

detecting a resize of the application window causing a change in the area of the application window comprising the non-primary content;

altering a size of the content display; and causing the content display to be redisplayed at the altered size.

43. The system of claim 30, the actions further comprising:

detecting a resize of the application window causing a change in an amount of available space within the application window; responsive to detecting the resize, altering a transparency attribute of the content display;

and causing the content display to be redisplayed according to the altered transparency attribute.

* * * * *

UNITED STATES PATENT AND TRADEMARK OFFICE
CERTIFICATE OF CORRECTION

| | | |
|---|---|---|
| PATENT NO. | : 8,156,444 B1 | Page 1 of 1 |
| APPLICATION NO. | : 10/750105 | |
| DATED | : April 10, 2012 | |
| INVENTOR(S) | : Stephen R. Lawrence et al. | |

It is certified that error appears in the above-identified patent and that said Letters Patent is hereby corrected as shown below:

Column 17, line 9, Claim 10; after "of the" add -- window --

Signed and Sealed this
Third Day of July, 2012

David J. Kappos
*Director of the United States Patent and Trademark Office*